TELEVISION KINESCOPE PROJECTION CIRCUIT
Filed July 16, 1949
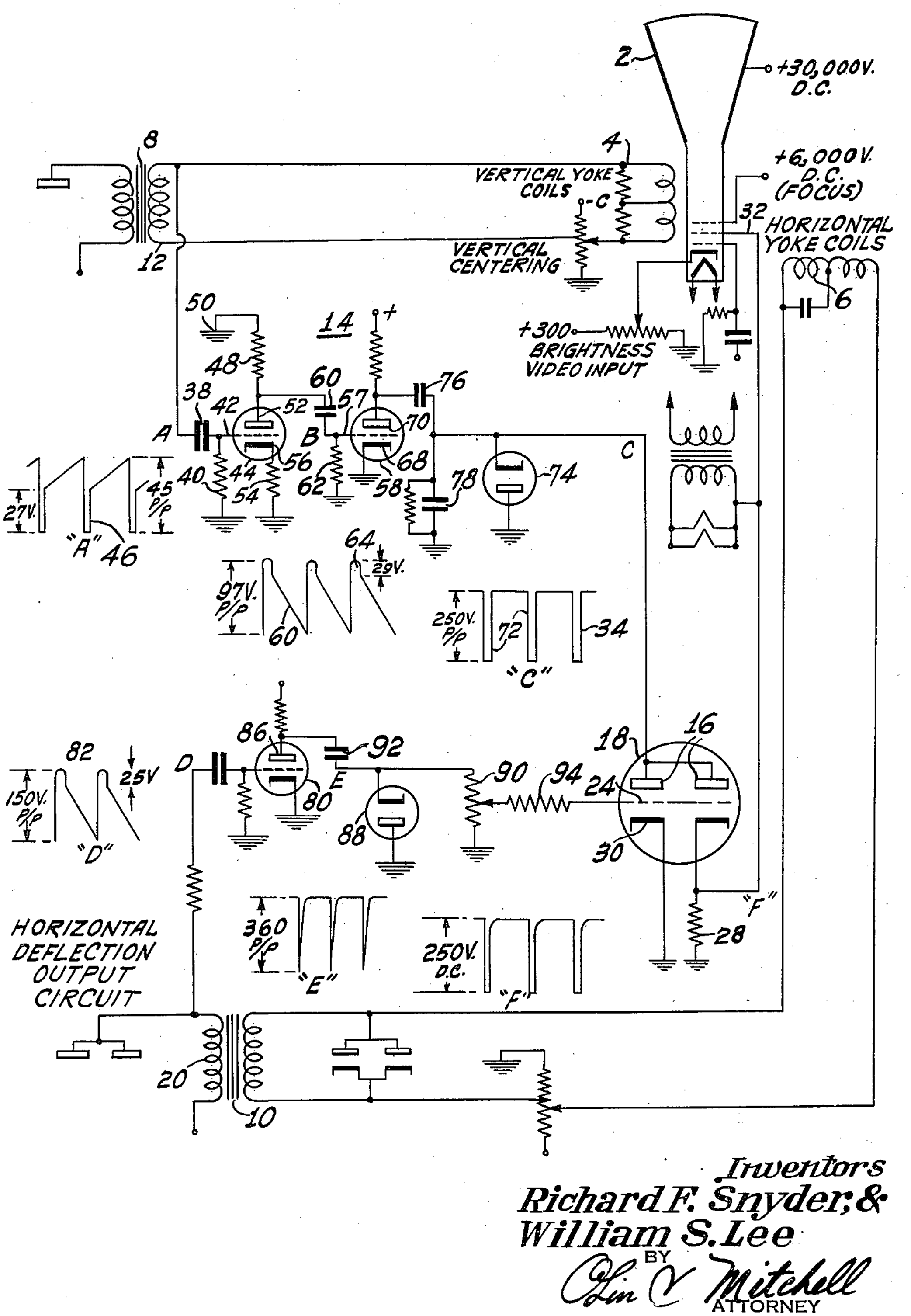
Inventors
Richard F. Snyder, &
William S. Lee
BY
Olin V. Mitchell
ATTORNEY

UNITED STATES PATENT OFFICE 2,584,932

TELEVISION KINESCOPE PROJECTION CIRCUIT

Richard F. Snyder, Oreland, and William S. Lee, Ivyland, Pa., assignors to Radio Corporation of America, a corporation of Delaware Application July 16, 1949, Serial No. 105,254

6 Claims. (Cl. 315—20)

This invention relates to television high voltage power supplies and more particularly to methods and means for removing the high voltage from television kinescopes and the like in case of a failure in the deflection.

In the projection type television receivers, a small cathode ray tube forms the primary image which is magnified and thrown on the screen by optical means. In order that there be sufficient light when the picture is expanded, the brilliance of the image on such tubes must necessarily be much greater than in ordinary tubes and accordingly, the accelerating voltages are such that the electrons in the electron stream travel at a much higher rate of speed. It is particularly important therefore that this high speed beam of electrons be kept moving across the face of the tube as the fluorescent material may be damaged if the beam comes to rest for even a matter of a few microseconds.

Many attempts have been made to overcome this problem and the present invention represents an improved arrangement whereby the accelerating anode voltage falls rapidly upon the failure of either the vertical or horizontal deflection circuits, thus not only slowing down the speed of the electrons in the beam but also defocusing the beams sufficiently to prevent its damaging the surface of the cathode ray tube.

Briefly, one or the other of the voltage waveforms supplied to the deflection circuits of the cathode ray tube is applied, after being modified, to the plate of a tube which may be a triode. The other deflection voltage waves are applied, after being modified, to the grid of the triode so as to control its conductivity. Accordingly, if the modified sweep voltage applied to the plates of the triode should fail, no current is drawn through the cathode circuit and if the modified sweep voltage applied to the grid should fail, the latter biases the tube beyond cutoff. The accelerating anode voltage is obtained from the cathode circuit and the speed with which it falls upon a failure of either the sweep voltages depends upon the time constant of the cathode circuit, and this depends entirely on the small stray capacitance in that circuit. Because the first anode of the cathode ray tube does not draw very much current, it is not necessary to supply it with voltage from a system having a large time constant, or, in other words, it is possible to provide a voltage supply circuit that requires very little smoothing. For these reasons, the system is self-protective for, should the rectifier or triode to which the sweep voltage is applied fail, the voltage applied to the first anode will fail also.

Accordingly, the object of this invention is to provide an improved protection system for a cathode ray tube to prevent damage upon failure of either sweep circuit.

Another object of the invention is to provide a voltage power supply for the first anode of a cathode ray tube that is also capable of protecting the tube upon failure of either sweep voltage.

A further purpose of the invention is to provide a self-protective voltage supply for the first anode of a cathode ray tube which has a low time constant and is therefore able to act with maximum speed upon the failure of either sweep voltage.

These and other objects have become apparent from a detailed consideration of the drawing in which the numeral 2 indicates a kinescope having a vertical deflection yoke 4 and a horizontal deflection yoke 6, that are supplied with the desired type of wave-forms by the transformers 8 and 10 respectively. The voltage across the secondary 12 of the transformer 8 is applied to a circuit arrangement, generally indicated by the numeral 14 which gives it suitable amplification and shape for application to the plates 16 of electron discharge device 18 which may also be termed a coincidence tube. The primary 20 of the horizontal deflection transformer 10 is connected to a circuit arrangement generally indicated by the numeral 22 that serves to amplify and shape the horizontal deflection voltages for application to the grid 24 of the vacuum tube 18. The first anode 32 of the cathode ray tube receives its voltage from the cathode 30 of this tube.

Before going into the details of the circuit arrangement indicated by the numerals 14 and 22 respectively, consideration is given to the over-all operation of the system. Upon application of the positive voltage to the plates 16, current will be drawn through the cathode resistor 28, providing the grid 24 is not biased beyond cutoff. While the horizontal deflection circuit is operative, a sufficiently positive voltage is applied to the grid 24 to keep the electron translating device 18 biased for conduction during horizontal sweeping. The negative serrations in the waveform C occur during vertical blanking of the cathode ray tube and the negative serrations in waveform F occur during horizontal blanking of the tube and therefore, since the second anode ircuit responds instantaneously to a change in he voltage applied to it, these serrations proluce no difficulty even if they are not smoothed ut. On the other hand, if the voltage output f the cathode of tube 18 were supplied to the ocusing coil, its inertia would prevent extremely apid decay of the field in the event of failure hat is attainable by this invention. This same nertia might also prevent proper focusing the nstant either horizontal or vertical blanking eases and sweeping starts. Furthermore, a hange in voltage of the accelerating anode deocuses the beam as well as slowing it down.

In order to understand how the sweep voltage aveform indicated by the letter A is developed ito a waveform such as is indicated by C and herefore suitable for application to the plate 16 nd thus to anode 32, a detailed consideration ill now be given to the circuit generally indiated in 14.

As previously stated, the waveform A is obained from the secondary 12 of the vertical weep transformer 8 and it is applied via coupling ondenser 38, of the grid leak resistor 40 to the rid 42 of amplifier 44. In order that this tube ay de-emphasize the sawtooth shape of the ulses in waveform A and supply a constant oltage to anode 32, the values of the circuit omponents including the plate resistor 48, the ource of fixed potential 50 and the resistor 54 hat is connected to the cathode 56 are so aranged that the tube 44 is driven to cutoff during his interval. As a result, the waveform B is resented to the grid 57 of the amplifier 58 via e coupling condenser 60 and grid leak resistor 2. Although this waveform has not been drawn scale, it is stated that the positive pips 64 are early the same amplitude as the negative pulses 6 due to the fact that the pips were not amplied, the tube being cut off, and the sawtooth poron of the wave 66 is amplified. In other words, e ratio of the pip 64 to the total wave B is less an the ratio of the negative pulses 46 to the eak to peak value of the waveform at A. Due the fact that the cathode 68 of the tube 58 is rounded, the grid current drawn during the ositive pip 64 is sufficient to bias the grid 57 to itoff just before the sawtooth portion 66 of the aveform B begins and accordingly, a waveform ich as shown at C is developed at the plate 70 the tube 58, in which the negative serrations correspond to the pips 64. The positive uare waves in between the serrations occur iring the time the tube 58 is cutoff, i. e., durig the sawtooth 66 of the waveform A and B.

In order to establish the low negative portions the serrations 72 at ground potential, a clampig tube 74 is connected to the plates 16 and is upled to the plate 70 via condenser 76. In rallel with the clamping tube 74 is a large restor 78 that serves to provide a d. c. return for e diode 74. The reason for developing the aveform C from the waveform shown at A is at if a substantially constant voltage is to be pplied to the first anode 32, more smoothing or, other words, a long time constant energy orage circuit would be required if the waveform A were applied to the plate 16 than if the aveform at C is used. The necessity of such long time constant energy storage circuit in e cathode circuit of the tube 18 would slow up e decay of the voltage applied to the anode 32 such an extent as to make it useless for prenting damage to the face of the tube 2.

If a horizontal sweep waveform such as shown at D were applied directly to the grids 24, the conductivity of the tube 18 would be effected accordingly, and the supplying of a substantially constant potential to the anode 32 would again require that the time constant of the cathode circuit of tube 18 be too long to be of utility in a protection circuit such as herein described. The principle of grid limiting is applied to the tube 80 in much the same manner as was done with relation to tube 58. Accordingly, the positive pips 82 of the waveform shown at D draw a sufficient grid current to bias the tube to cutoff during the sloping or sawtooth portion of the waveform 84 and the waveform shown at E is present at the plates 86 of the tube 80. The diode 88 is connected in parallel with the potentiometer 90 in order to insure that the waveform E that is coupled thereto by a condenser 92 is clamped to a ground potential in such a manner that the major portion of the waveform is in a positive direction. A large resistor 94 which may be the order of 10 megohms is connected in series between the potentiometer 90 and the grid 24 in order to protect the tube 18 upon failure of the positive voltage supplied to the plate 16, for in such an event the cathodes 30 drop to a low value and the grid current drawn under these conditions would be sufficient to destroy the tube 18. It is only necessary that the voltage so applied to the grids 24 be sufficiently positive to keep a tube 18 in a conducting condition and that it be of such a wave shape as to not require smoothing in the cathode circuit.

It will be apparent to those skilled in the art that the positions of the circuits 14 and 22 could be interchanged. That is to say, the waveform C derived from the vertical deflection waveform from the circuit 14 can be applied to the grid 24 and the waveform E that is derived from the horizontal deflection voltages D could be applied to the plates 16.

Another variation which would give protection in the event of failure of one of the sweep circuits would be to connect the plate 16 to a source of fixed potential at any convenient point in the power supply system of the television receiver and to apply either one of the voltages developed by circuit 14 or 22 to the grid 24. If, for example, the horizontal deflection voltage were connected as shown in the drawing, and a source of fixed potential were connected to the plate 16, failure of the horizontal deflection circuit would cause a rapid reduction in the voltage applied to the anode 32, thus protecting the face of the kinescope.

It is considered that the above invention is superior to those in the prior art for the reason that it is quick acting and self-protective. That is to say, a failure of the tube 18 or even an opening in the lead going to the anode 32 would protect the face of the kinescope from damage. The rapidity of this action is achieved by a twofold effect of the first anode 32 on the electron beam. The beam is slowed down as well as being defocused.

Having described our invention, we claim:

1. A self-protective voltage supply arrangement for a cathode ray tube comprising a source of fixed potential, an electron translating device having at least a plate, a grid and a cathode, a first source of voltage waves suitable for use in the deflection circuits of the cathode ray tube, means for coupling said source to said grid to control the conduction of the translating device, a second source of voltage wave suitable for use in deflection circuits of the cathode ray tube, means for coupling said second source to the plate of said translating device, and an impedance connected in the cathode circuit of said translating device and means for connecting the potential appearing across said impedance to an electrode within said cathode ray tube.

2. A voltage supply and protection circuit for use with a cathode ray tube comprising a first source of sweep voltage waves, means for blanking a cathode ray tube between each of said voltage waves, means for developing rectangular waves from said sweep voltage waves in between blanking intervals, a second source of sweep voltage waves, a means for blanking said cathode ray tube during the interval between each of the latter sweep voltage waves, means for developing a rectangular pulse from said sweep voltage waves during the interval between blanking, a coincidence tube and means for applying both of the said rectangular waves to said coincidence tube an impedance connected in series with said coincidence tube, and means for controlling the conductivity of said cathode ray tube in response to the voltage appearing across said impedance.

3. A system for supplying a fixed potential to the accelerating anode of a cathode ray tube during the presence of both the horizontal and vertical sweep voltages comprising an electron discharge device having at least a plate, a grid and a cathode, a source of vertical sweep voltage waves, a two-stage amplifier coupled to said source, a clamping circuit coupled to the output of said amplifier, the plate of said electron discharge device being connected to said clamping circuit, a source of horizontal sweep voltage waves, a second amplifier stage connected to the latter source, a clamping circuit coupled to said second amplifier, means for connecting the grid of said discharge device to the latter clamping circuit and an impedance connected in the cathode circuit of said electron discharge device across which supply voltage is available.

4. A protection and voltage supply circuit for use with a cathode ray tube comprising in combination an amplifier having at least a plate, a grid and a cathode, a first source of deflection voltage waves, means for applying positive voltage to said plate in response to said voltage wave from said first source, a second source of deflection voltage waves, means for controlling the positive potential applied to said grid in response to the said voltage waves from said second source, a resistor connected in series with said cathode, and means for controlling the intensity of the beam of electrons in said cathode ray tube with potential thus created across said resistor.

5. A protection device as described in claim 4 in which said first mentioned means is adapted to apply a rectangular wave to said plate.

6. A protection device as described in claim 4 in which said second mentioned means is adapted to apply substantially rectangular waves to said grid.

RICHARD F. SNYDER.
WILLIAM S. LEE.

REFERENCES CITED

The following references are of record in the file of this patent:

UNITED STATES PATENTS

| Number | Name | Date |
|---|---|---|
| 2,098,384 | Goodrich | Nov. 9, 1937 |
| 2,152,821 | Schlesinger | Apr. 4, 1939 |
| 2,202,171 | Stocker | May 28, 1940 |
| 2,261,645 | Delvaux | Nov. 4, 1941 |
| 2,514,079 | Lockhart | July 4, 1950 |